United States Patent [19]

Macikunas et al.

[11] Patent Number: 4,843,396
[45] Date of Patent: Jun. 27, 1989

[54] TRIHEDRAL RADAR REFLECTOR

[75] Inventors: Arunas Macikunas, Hamilton; Simon Haykin, Ancaster; Terrence Greenlay, Dundas, all of Canada

[73] Assignee: Canadian Patents and Development Limited/Societe Canadienne des Brevets et d'Expolitation Limiteé, Ottawa, Canada

[21] Appl. No.: 120,722

[22] Filed: Nov. 16, 1987

Related U.S. Application Data

[63] Continuation of Ser. No. 798,538, Nov. 15, 1985, abandoned.

[30] Foreign Application Priority Data

Nov. 21, 1984 [CA] Canada .................................. 468365

[51] Int. Cl.$^4$ ............................................. H01Q 15/18
[52] U.S. Cl. ........................................................ 342/7
[58] Field of Search ...................................... 342/1–12; 343/912

[56] References Cited

U.S. PATENT DOCUMENTS

| | | | |
|---|---|---|---|
| 2,472,782 | 6/1949 | Albersheim | 343/18 R |
| 2,697,828 | 12/1954 | Heintz | 343/18 D |
| 2,786,198 | 3/1957 | Weil et al. | 343/18 C |
| 2,872,675 | 2/1959 | Kennaugh | 343/18 C |
| 3,161,879 | 12/1964 | Hannan et al. | 343/18 B |
| 3,167,769 | 1/1965 | Boyer | 343/18 C |
| 3,309,705 | 3/1967 | Blank et al. | 343/18 C |
| 3,417,398 | 12/1968 | Lewis et al. | 343/18 R |
| 3,737,904 | 6/1973 | Mori et al. | 343/18 B |
| 4,724,436 | 2/1988 | Johansen et al. | 342/7 |

FOREIGN PATENT DOCUMENTS 0424263 9/1974 U.S.S.R. .............................. 343/18 B

OTHER PUBLICATIONS

*Microwave Journal*, (Jul. 1983), "Polarimetric Techniques in Radar Signal Processing", S. R. Cloude, pp. 119–127.
*Principals of Radar*, (1952), Section 9.4, "Navigation and Pilotage"–Corner Reflectors, Reintjes, et al., pp. 324–331.
*Antenna Engineering Handbook*, (1961), Chapter 13, "Passive Reflectors", Jakes et al, pp. 13-1-13-14.
*Antenna Engineering Handbook*, (1961), Chapter 25, "Radar Antennas", R. L. Mattingly, pp. 25-1-25-8.
*Bell System Technical Journal*, (Oct. 1947) vol. 26, "Targets for Microwave Radar Navigation", S. D. Robertson, pp. 852–869.
*Principals of Radar*, (1952), Section 1.3, "Design Considerations", Reintjes et al., pp. 14–19.

*Primary Examiner*—Theodore M. Blum
*Assistant Examiner*—Bernarr Earl Gregory
*Attorney, Agent, or Firm*—Rogers & Scott

[57] ABSTRACT

A new type of passive trihedral corner reflector is described which rotates the polarization of a reflected microwave beam by 90° and thereby permits a reflected radar beam to be more easily distinguished by the interrogating radar system from the random reflections from nearby objects, i.e., clutter. Rotation of the incident beam is provided by locating a passive polarizing or "twist" grid of closely spaced thin parallel wires spaced above one conducting surface by air or by a dielectric to give an electric spacing from the surface of about 0.25 λ. The spacing of the wires is less than 0.25 λ so that the wires constitute a reflecting surface for signals polarized parallel to the wires. The reflector can have triangular or square sides which are mutually orthogonal. In a preferred embodiment the reflector is tipped forward by 35° from a reference horizontal plane and tilted clockwise in a vertical reference plane by 15° to optimize reflections. The reflector has particular application to navigation systems, especially to maritime navigation systems.

11 Claims, 6 Drawing Sheets

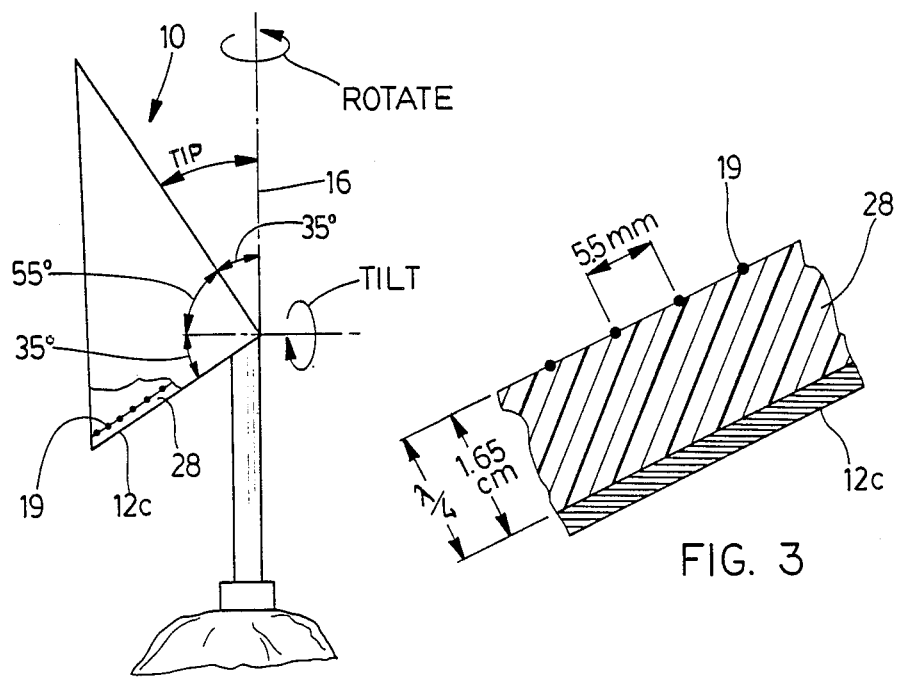
FIG. 2
FIG. 3
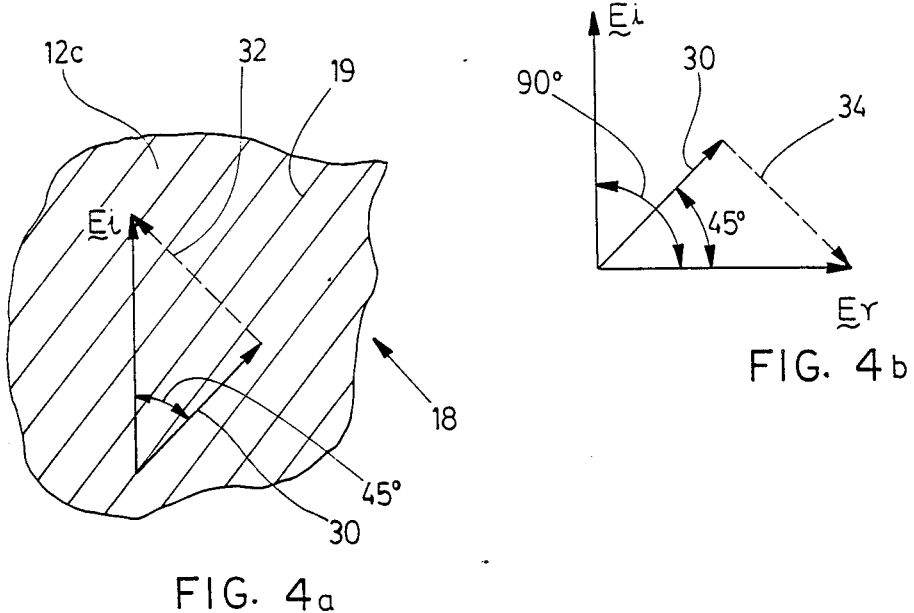
FIG. 4a
FIG. 4b

TRIHEDRAL RADAR REFLECTOR

This application is a continuation of our application Ser. No. 06/798,538 filed 11/15/85, now abandoned.

FIELD OF THE INVENTION

The present invention relates to a passive, non-powered radar reflector of the trihedral type and particularly, but not exclusively, to such radar reflectors for use in maritime navigation systems, and to a system of navigation employing such radar reflectors.

REVIEW OF THE PRIOR ART

Passive Radar reflectors have particular application in navigation, especially navigation in inland waterways, lakes, harbours and the like, in that it is particularly important in these environments for ships to be able to very accurately determine their position. By locating passive radar reflectors at strategic positions, especially on land, which respond strongly to interrogation from a ship radar system, the radar system is able to identify the position of the ship readily and accurately with respect to the reflectors.

A passive reflector device that merely reflects the incident energy is preferred in order to minimize initial manufacturing and installation cost, and also subsequent maintenance costs, as compared for example to a transponder device which produces a signal in response to the receipt of a signal. For the same reason it is preferred to use reflectors that do not require any form of power supply, and such a reflector is also commonly described in the art as a "passive" reflector, although a more accurate designation for this aspect of its physical characteristics is "non-powered".

Trihedral corner radar reflectors are well known and their properties are relatively well documented (e.g. see Antenna Engineering Handbook - H. Jasik, Editor, Chapter 13 "Passive Reflectors"). The trihedral corner reflector consists of three reflecting planes assembled so as to form a right angle corner. In general, a beam incident upon an interior surface of the corner undergoes a reflection from each of the three surfaces in turn, and is reflected in a direction parallel to and with the same polarization as the incident beam. A trihedral reflector usually has triangular sides or square sides. The effective radar cross-section of a square-sided trihedral reflector is larger than that of a triangular-sided trihedral reflector, but the beamwidth of the latter is somewhat greater.

It will be appreciated that the maximum amount of energy is reflected when the radiation is directed into the trihedral reflector in an optimum direction, i.e. so that the incident radiation makes equal angles with all three planes. As the direction of the incident radiation changes from this optimum, the amount of energy reflected diminishes.

The radar cross-section, $\sigma$, of a corner reflector at optimum orientation is given by the following equations, equation (1) giving the value for square-sided reflectors and equation (2) giving the value for triangular-sided reflectors:

$$\sigma(\text{squares}) = \frac{12\pi a^4}{\lambda^2} \quad (1)$$

$$\sigma(\text{triangles}) = \frac{4\pi a^4}{3\lambda^2} \quad (2)$$

where "a" is the length of a common corner and $\lambda$ is the radiation wavelength. For radiation in the microwave range e.g. $\lambda = 3$ cm, and for a corner length of 1m, the radar cross-section for a triangular reflector is about 4,600 m² and for a square reflector about 47,900 m². A trihedral triangular corner reflector of about 1 m corner length presents approximately the same radar cross-section as a boat 40 meters long. However, if the radiation wavelength increases to 1 m, the effective radar cross-section is only 4 sq.m. The triangular sided corner reflector is more common than the square-sided corner reflector, because of its better angular response in the azimuthal plane and because it is much easier to construct.

Beamwidth is a term generally used to define the angle of response of the reflector, and the triangular trihedral reflector has a 3 dB beamwidth of about 45°. It is important that the three planes of the corner reflector lie at exactly 90°, or the echo obtained is substantially reduced. For example, a trihedral reflector of 50 cm side length illuminated by a 3 cm wavelength radar beam will have its echo reduced by one half (3 dB) if the angle between the planes is 89° rather than 90°.

Such radar reflectors should satisfy a number of basic design criteria in addition to being inexpensive, rugged and reliable. It should provide a large radar cross-section relative to its physical size, which should be relatively small for aesthetic and environmental reasons. Moreover, this radar cross-section should readily be "seen" over a wide angle.

All such trihedral corner reflectors suffer from the disadvantage that since they merely passively reflect the incident signal, it is difficult to accurately locate the position of the reflector, and hence of the radar transmitter relative to the reflector, when strong unwanted returns (i.e. clutter) are present, such as weather, reflections from nearby objects, such as buildings and trees, and reflections from the water surface as are commonly found along inland waterways.

The provision of means for reflecting electromagnetic waves, while at the same time twisting the polarization of the incident wave by 90 degrees, is already known, for example, from U.S. Pat. No. 3,161,879, issued Dec. 15, 1964, to R. W. Hannan et al., the disclosure of which is incorporated herein by this reference. Briefly, such a means may be provided by mounting a grid of thin parallel wires at a spacing of a quarter wavelength of the incident radiation from a conducting surface; such a structure completely reflects the component polarized parallel to their projection and completely transmits the perpendicular component, so that the sum of the two reflected waves have their polarization plane shifted by 90° relative to the incident radiation.

There is described in USSR Inventor's Certificate Ser. No. 424,263, issued to Radiotechnical Institute TAGANROG, inventors B. M. Petrov et al, published 16th Sept. 1974, a proposal for a trihedral angular reflector intended to control the polarization and strength of the incident signals. Petrov et al propose to provide control of the polarization characteristics in such a reflector by means of controlled elements on one of its surfaces, comprising gas-discharge tubes disposed parallel to "one of its metal inner surfaces", the inner metal electrodes of these discharge tubes being connected to a controlled current source. Petrov et al state that "gas discharge plasma is generated when voltage is applied to the electrodes and its electrodynamic parameters depend on the discharge current's magnitude. When the radar signals are being reflected through the plasma, the polarization characteristics depend on the electrodynamic parameters of the plasma i.e. the discharge current's magnitude." The drawing accompanying the description shows a trihedral reflector with a plurality of elongated rectangles representing gas discharge tubes of progressively shorter length disposed parallel to one another and to the outer edge of one side of the reflector. The description contains no other information as to the manner in which the control of the polarisation and strength of the incident signals is to affect those signals, and not other information as to how the reflector structure is to be constructed, adjusted and operated.

DEFINITION OF THE INVENTION

It is an object of the present invention to provide an improved trihedral radar reflector which affects a change in the polarization of the incident beam so that the resultant reflected beam can be more easily distinguished from the ordinary like polarized return by the radar system.

Accordingly, the present invention provides a passive trihedral radar reflector having a polarizing surface which will reflect a beam incident upon the reflector interior in a direction parallel to the incident beam and with a different polarization from the incident beam.

In a preferred embodiment of the invention, the or each (in the case of a cluster), trihedral corner reflector has conductive triangular sides orthogonal to each other and a wire passive polarization grid, generally referred to as a polarization "twist" grid, parallel to and spaced above one side, with the direction of the wires in the grid parallel to a corner junction between two of the sides of the reflector. Symmetrical electromagnetic images of the grid occur in the other two orthogonal conducting surfaces. The trihedral reflector is tipped forward from a reference orientation as specified herein at an angle of 35° to the horizontal to optimize reflection and is also tilted clockwise in a reference plane as specified herein at an angle of 15° about an apex passing through the apex to obtain maximum like-polar rejection and to ensure that the incident and reflected beams are exactly at 45° with respect to the polarization twist grid as seen by the interrogating antenna of the radar system.

In one alternative embodiment of the invention the reflector's bottom surface is inverted through 180° to improve weather shielding, and in another alternative embodiment the reflector has square sides.

DESCRIPTION OF THE DRAWINGS

These and other aspects of the invention will become apparent from the following description when taken in combination with the accompanying drawings in which:

FIG. 2 is a cross-sectional view taken on the line 2—2 of FIG. 1;

FIG. 3 is an enlarged view of part of the bottom reflection surface of the reflector of FIGS. 1 and 2, illustrating for this embodiment the mounting of the wire grid and the relative proportions of the wire grid and the spacing between the wires and the surface;

FIGS. 4a and 4b are respectively a front view of a polarizing grid on a reflecting surface and a corresponding vector diagram showing how the polarization of the reflected wave is rotated by 90° from the incident wave;

DESCRIPTION OF THE PREFERRED EMBODIMENTS

Figure 1:
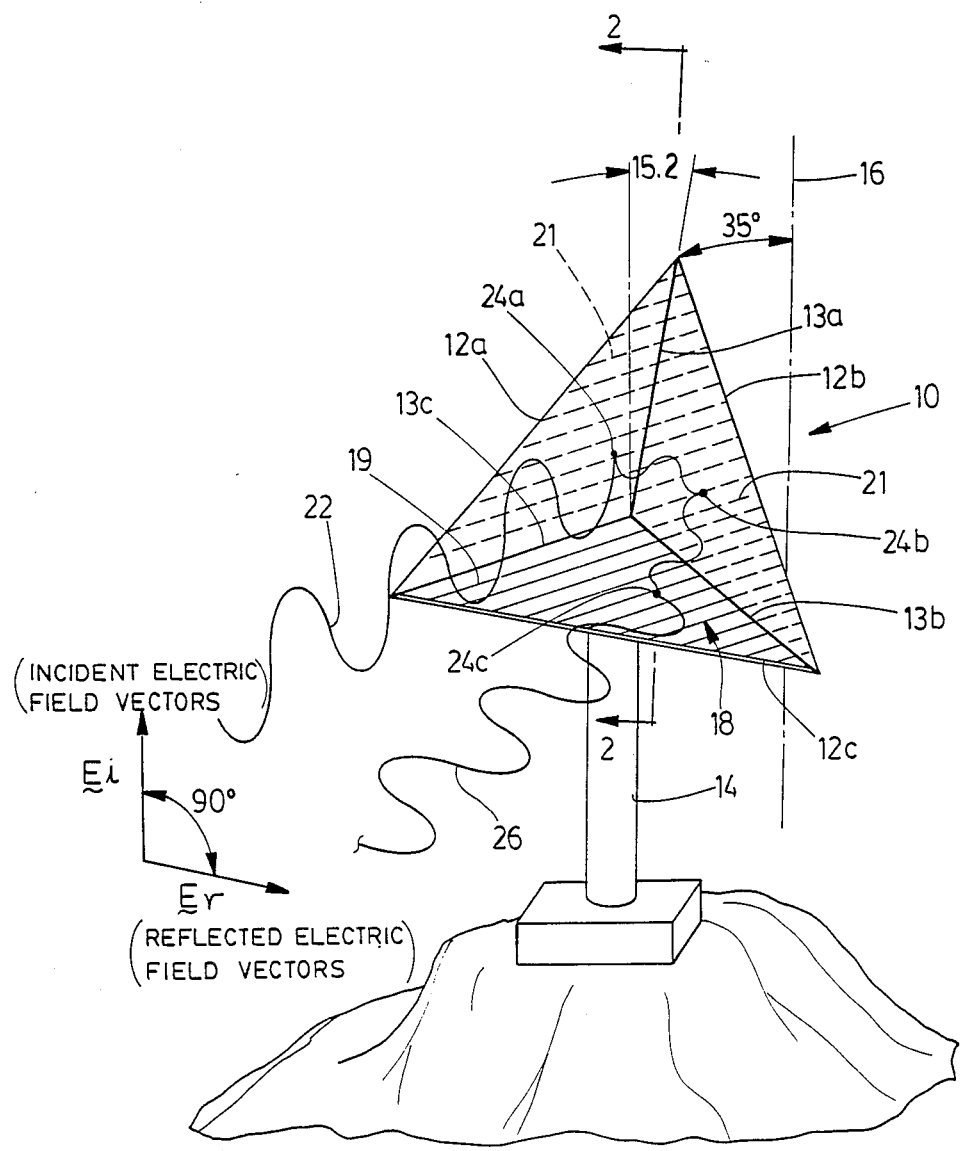
FIG. 1 is a perspective view of a trihedral corner reflector which is a preferred embodiment of the invention shown mounted in an optimum orientation relative to the incident signal.

Reference is first made to FIG. 1 of the drawings which shows a trihedral corner reflector, generally indicated by reference numeral 10, which is a preferred embodiment of the invention. The reflector consists of three triangular planar conducting surfaces 12a, 12b and 12c usually of metal, which are mounted so that they are exactly orthogonal to each other to meet at respective junctions 13a, 13b and 13c. For the purpose of explanation and definition in the specification and claims a "reference" orientation for the reflector is adopted to which variations in orientation about the usual three orthogonal axes and relative to the horizontal "ground" on which it is located can be referred. Thus, the ground in question may actually be the ground, but it could also, for example, be a floating buoy on which the reflector is mounted. In this reference orientation the "bottom" surface 12c and the junctions 13b and 13c are horizontal, the junction 13a between the two "side" surfaces 12a and 12b is vertical, and a reference plane 16 passing through the said junction 13a extends parallel to the plane of the figure. Rotation back and forth about one axis out of the reference plane of the figure and perpendicular thereto is referred to as "tipping", while rotation clockwise or anticlockwise about a second axis parallel to the reference plane is referred to as "tilting"; rotation about the remaining third axis will be referred to as "rotation".

The trihedral reflector is mounted by means not illustrated on a support structure 14, which means permits the reflector to be tipped forward and back, towards and away from the incident beam, and so that the surface 12c is no longer horizontal, and also to be tilted in the plane of the figure relative to the reference plane 16 for optimum orientation of the reflector as will be explained below. The bottom triangular surface 12c has a passive, non-powered fine wire polarizing "twist" grid indicated by reference 18 mounted thereon, as described below. The wires 19 of the grid are positioned parallel to a corner 13c between the surfaces 12a and 12c, so that the resultant electromagnetic images of the polarization grid in the surfaces 12a and 12b, as shown in broken lines 21, appear symmetrical. An incident polarized microwave signal 22, illustrated herein for simplicity as a vertically orientated sine wave, is incident on the surface 12a at a point 24a, is reflected therefrom onto surface 12b at point 24b, and then onto bottom surface 12c at point 24c, where the signal is rotated through 90°, so that the reflected wave 26 has a polarization of about this amount different from that of the incident wave. For optimum reflection of the signal the trihedral reflector is tipped forward from the reference orientation by 35°, tilted clockwise in the plane of the figure by 15°, and rotated so that the incident radiation impinges at 45° with respect to the wire grid.

Since the reflected echo is shifted in its polarization through the specific value of about 90 degrees the interrogating radar system is able more readily to detect echoes received from such a source, and to discriminate them from those received from other objects which, even if they produce a change in polarization, will do so in a random manner and/or by an amount that will change randomly as the incident angle of the radiation changes. For example, the radar system may be arranged to provide special identification of an echo source with which the change of polarization is about 90° and/or with which the change remains relatively stable over a period of time. The reflector of the invention not only changes the polarization in the manner described, it maximizes the rejection of reflected signals of the same polarization as the incident signal, and also maximizes the reflection of signals in which the polarization has been modified or twisted to permit a strong readily detected and discriminated echo to be obtained.

Reference is now made to FIG. 2 which illustrates the above-described forward tipping of the trihedral corner reflector in the vertical plane, so that the bottom surface 12c makes an angle of 35° with and below the horizontal. It will be seen from FIG. 2 that the tipping also inclines the vertical junction at the 35° angle to the reference plane 16. The polarizing grid 18 is located above and close to the bottom surface 12c at a predetermined distance therefrom. As best seen in the enlarged view of FIG. 3 the polarization grid 18 is comprised of uniformly spaced parallel fine copper grid wires 19 spaced apart a distance chosen to be less than one quarter wavelength ($\lambda/4$) of the frequency of interest, so as to minimize diffraction effects. The entire grid is spaced physically above the flat conducting surface so as to be spaced electrically $\lambda/4$ of the frequency of interest therefrom, the physical spacing required depending upon the permittivity of the dielectric in the intervening space. In this embodiment the grid is spaced about 0.55 of the wavelength of interest above the flat conducting surface by a low-loss low relative-permittivity solid dielectric 28, such as styrofoam. The use of a solid dielectric simplifies the mounting of the wires at the correct spacing from the conductive surface, but instead the wire grid can be suspended above the surface with the ambient air as the dielectric. The wire diameter or gauge is calculated based on this choice of spacing and dielectric and, for example, for a microwave beam of about 3 cm wavelength a spacing of the wires from one another of 5.5 mm is satisfactory, while the distance between the wires and the conducting metal surface 12c with the specified styrofoam support is about 1.65 cm.

The polarizing twist grid 18 provides optimum polarization change when it is oriented at an angle of 45° with respect to the incident wave polarization. Referring to FIG. 4a, the incident wave 22 can be considered as two separate components 30 and 32 respectively parallel and perpendicular to the wire grid 18. The component that is parallel to the grid is almost completely reflected, as if by a perfect reflecting plane, since the grid of closely spaced wires at the specified spacing from each other and from the conductor 12c acts as a perfect short circuit. The location of this short circuit in space is somewhere between the wire grid and the metal reflector 12c. This effect is caused by the susceptance of the wires and the transmission line nature of the reflections. The perpendicular component of the wave propagates through the grid and through the dielectric until it strikes the reflecting surface 12c whereupon it is reflected. This reflected component again passes through the wire grid 18 and, because it is still polarized perpendicular to the wires, passes through without much deflection or attenuation. Although the distance between the grid and the reflecting backing is physically 0.55 $\lambda$ it is electrically one quarter wavelength. Thus, the perpendicular component 34 of the wave that passes through the grid exits with a phase shift of about $\lambda/2$. When this delayed reflected component 34 of the incident wave is added vectorially to the component 30 that is initially reflected from the grid the polarization of the resultant reflected wave is rotated or twisted by 90° from the incident polarization (see FIG. 4b).

Because the reflection of the wire grid in the other two faces of the trihedral makes the same angle with respect to the vertical (as shown in FIG. 1), the incident wave striking the wire grid either directly or after first being reflected by one or other of the reflector surfaces will always have equal components reflected parallel and perpendicular to the wire grid. Because the magnitude of the parallel or perpendicular components are equal at the surface of the wire grid, the twist grid will work as described before. The only difference is that there is no longer normal incidence to the wire grid surface and the law of optical reflection requires that the angle of incidence of the wave equal the angle of reflection. Because the reflection of incident waves by the face of the trihedral which has been modified by the polarization twisting grid is not unlike that from an ideal trihedral reflector, except for the twist of polarization, the 180° reflection properties of the trihedral reflector are maintained.

Figure 5:
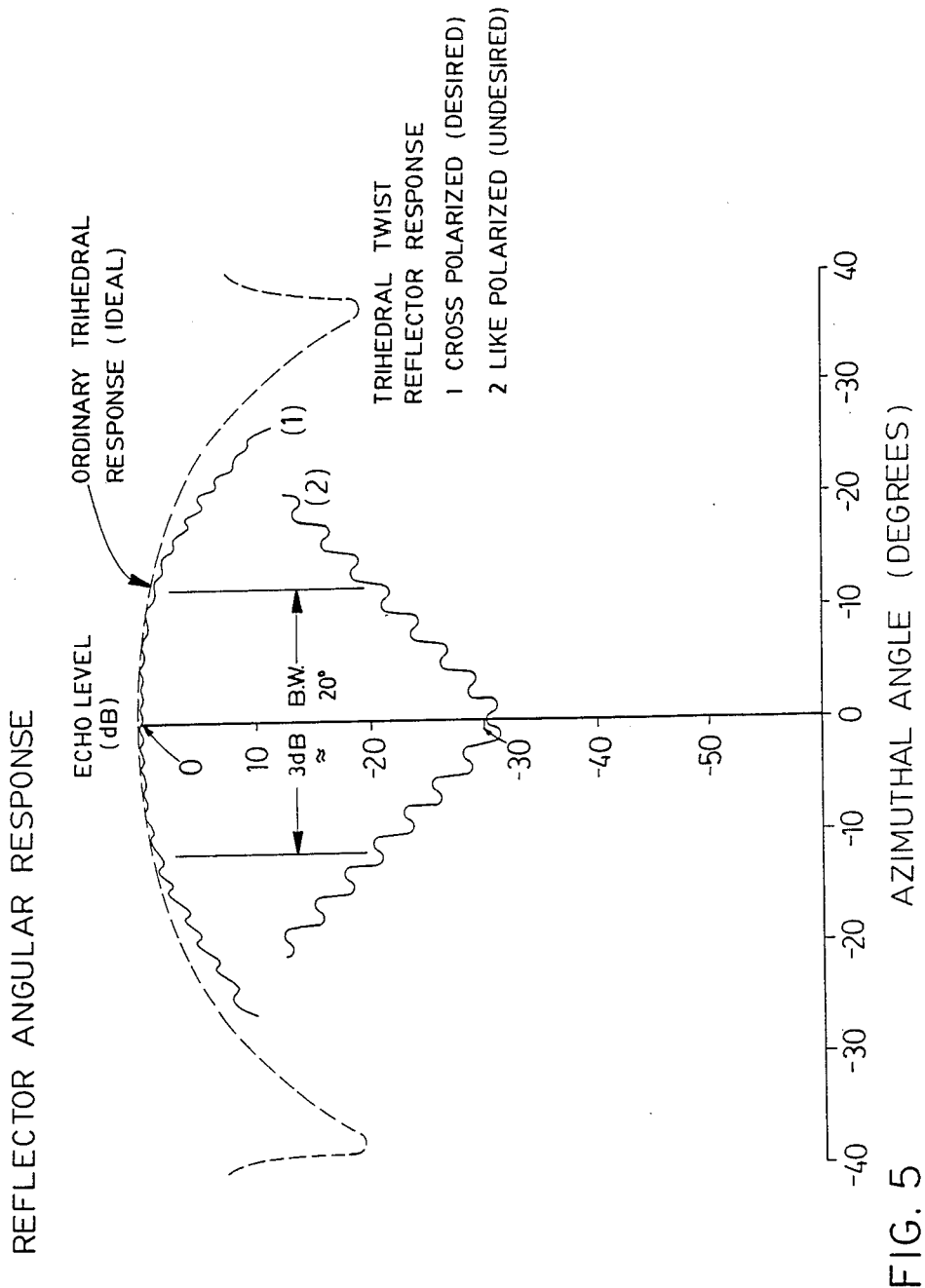
FIG. 5 is a graph showing for the reflector of FIG. 1 the relationship between the reflected signal strength and angle of orientation of the incident beam in the azimuthal plane.

Experiments were carried out using a trihedral reflector as illustrated by FIG. 1 of 60 cm corner length with a polarization grid of wires approximately 50 $\mu$m in diameter, spaced 5.5 mm apart and spaced from the bottom reflector surface by 16.5 mm using styrofoam as the wire supporting dielectric. Incident radiation of frequency 9.6 Gigahertz (3.2 cm wavelength) was directed at the reflector. Analysis of the performance was carried out and the reflector angular response plotted, as seen in FIG. 5, which is a typical graph showing the relationship between the strength of the reflected signal and angular orientation of the incident beam in the azimuthal plane of the reflector. It will be seen that a 3 dB beamwidth is obtained over an angle of 20° (10° each side of reference), which is about half that of an ordinary trihedral reflector. The reduced beamwidth angle is however more than compensated by the improved discrimination that is possible.

Figure 6:
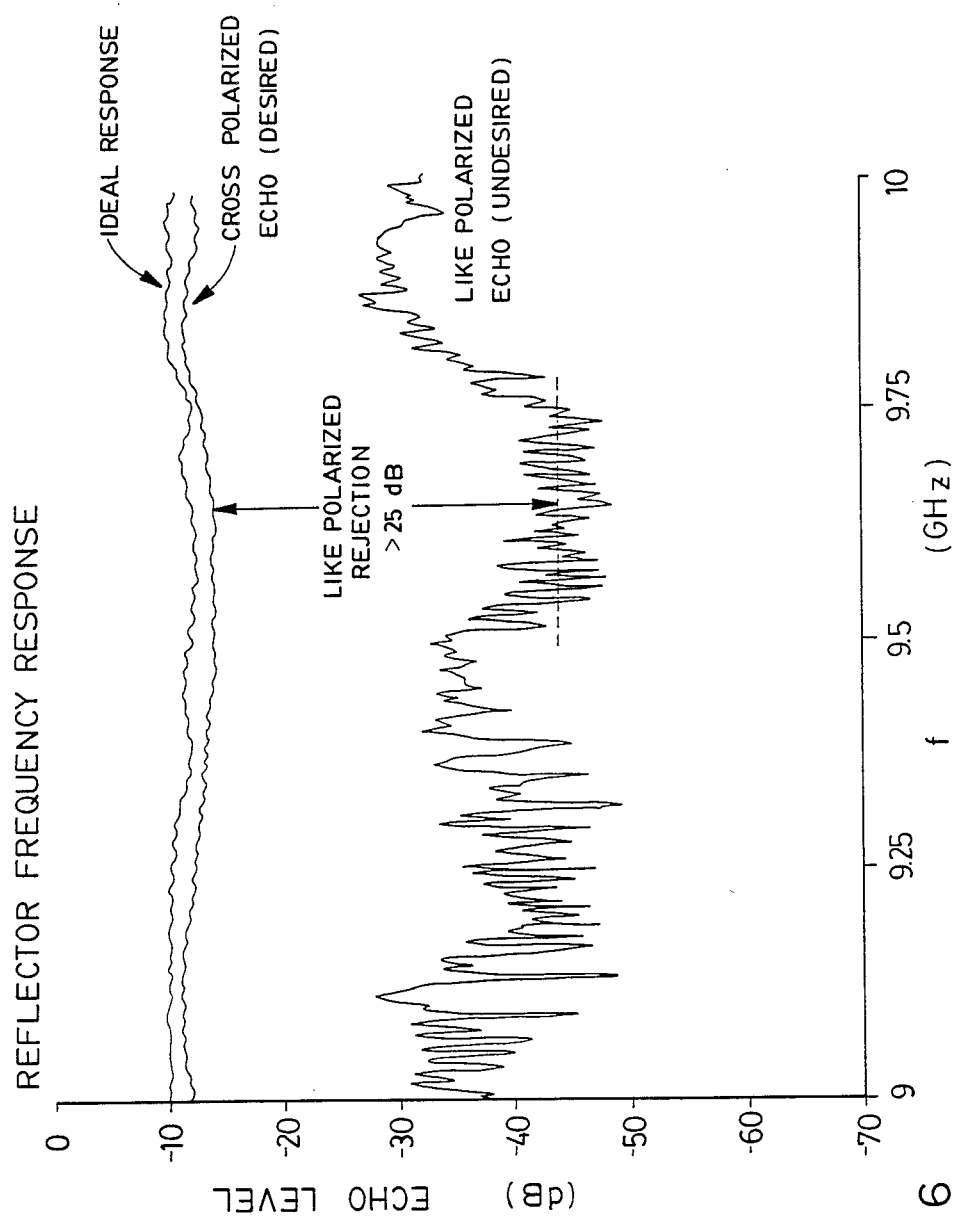
FIG. 6 is a graph showing the relationship between the reflected signal strength for different polarization modes and the frequency of the incident signal.

The reflector frequency response was also plotted and is shown in FIG. 6, the strength of the actual cross polarized echo being plotted with the corresponding ideal response. It will be seen that the 3 dB bandwidth for a trihedral reflector with a polarization grid was maintained over a wavelength difference in excess of one Gigahertz (actually 9 to 10 Gigahertz). Over this range of frequency the echos from the twist reflector are only about 0.5 to about 2.0 decibels less in magnitude than that of an ideal lossless trihedral reflector of the same size. It is also seen in this figure that at head-on incidence the like-polarized rejection was at least 25 dB (average about 28 dB) below the cross polarized (desired) reflection level. These results clearly demonstrate that the trihedral twist reflector of the invention produces an acceptable and usable cross polarized echo over a wide range of angles and frequencies.

As described above this excellent response was obtained by tilting the reflector by 15° clockwise in the plane to the orientation seen in FIG. 1, this orientation ensuring that the incident and reflected electric fields are precisely at 45° with respect to the wire grid as seen by the radar system. In addition, as also described above, the reflector was tipped forward so that the bottom surface 12c makes the angle of 35° to the horizontal. Finally the reflector will be disposed so that for the most critical distance to be determined by the radar system the incident radiation impinges at 45° at the junction of the two "perpendicular" sides, and midway along the third side, so that the apex of the trihedral reflector points in the direction of the propagation of the incident radiation.

Figure 7:
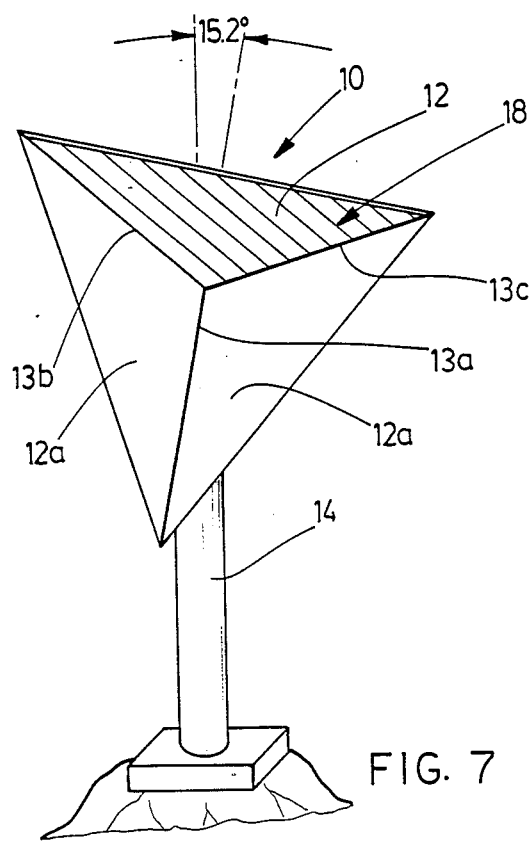
FIG. 7 is a front perspective view of the reflector of FIG. 1, showing it turned upside down so as to use the sides of the reflector as weather shielding.

FIG. 7 illustrates a trihedral reflector similar to that of FIG. 1 but in this case the reflector is inverted by 180° and the surface 12c on which the polarization grid 18 appears is now on the top surface. The structure in this orientation has the same response as the reflector shown in FIG. 1, but has advantages of better weather shielding, and the angle of the faces is such that any snow, rain or ice will tend to run off them.

Figure 8:
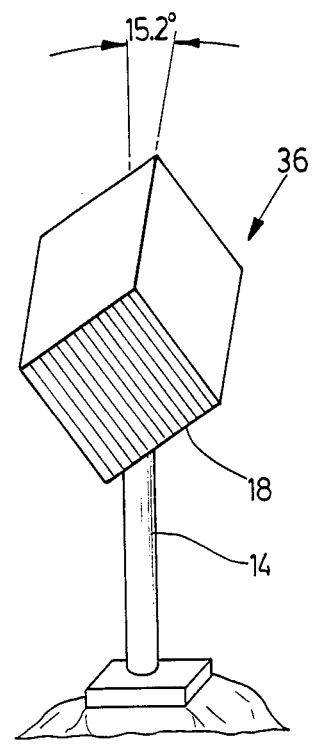
FIG. 8 is a view similar to FIG. 1 of an alternative embodiment of a trihedral reflector according to the invention, the reflector having square sides.

The trihedral reflector structure with triangular sides is preferred because of its good angular response and also because it is easier to construct than a square sided reflector. However, it will be understood that a square sided trihedral reflector, as shown in FIG. 8, and generally indicated by the reference numeral 36, can also be provided in accordance with the invention. This form of reflector has a larger effective radar cross-section than the trihedral reflector in accordance with equation (1) above but its angular response is about 10° less than the triangular-sided trihedral reflector in the azimuthal plane. It will be appreciated that the polarization grid is oriented in the same manner as with the trihedral reflector and produces similar images in the square reflecting surfaces.

Figure 9A:
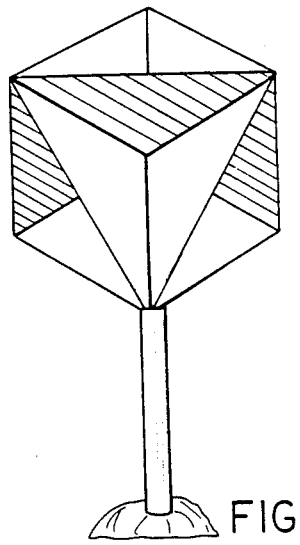
FIGS. 9a and 9b show two different clusters of trihedral triangular-sided and square-sided reflectors respectively for providing wide angle response in the azimuthal plane.
Figure 9B:
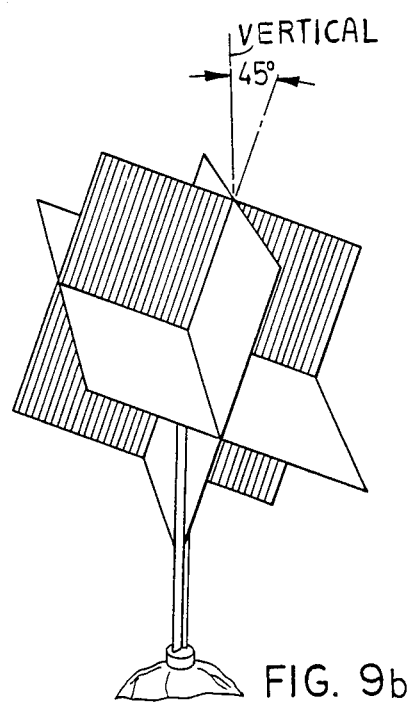

Reference is now made to FIGS. 9a and 9b of the drawings which show how reflectors in accordance with the invention can be combined in clusters to provide a target to reflect in all directions such as would be preferred on an anchored buoy. In the examples shown 6 trihedral corner reflectors having triangular sides, or 8 trihedral corner reflectors having square sides respectively, are mounted so as to give proper orientation to three or four respectively of the corners when a search radar antenna is directed at the reflector.

It will be appreciated that various modifications may be made to the embodiments hereinbefore described without departing from the scope of the invention. For example, the dimensions given for the trihedral corner reflector for both square and triangular sides are exemplary only, and the grid size, spacing and dielectric medium may all be modified in accordance with the specific requirements of the interrogating radar system. Such calculations are straightforward to those skilled in the art and the dimensions and proportions of the reflector may be modified accordingly to provide the desired cross-section for a particular radar system frequency. Also, it will be appreciated that the invention is not limited to any particular type of materials or dimensions and the trihedral reflectors can be used in orientations other than optimal, it being understood that the echo received over a wide angle range would then be less than that obtained with the optimal arrangement; however, it would still be acceptable in certain situations.

Figure 10:
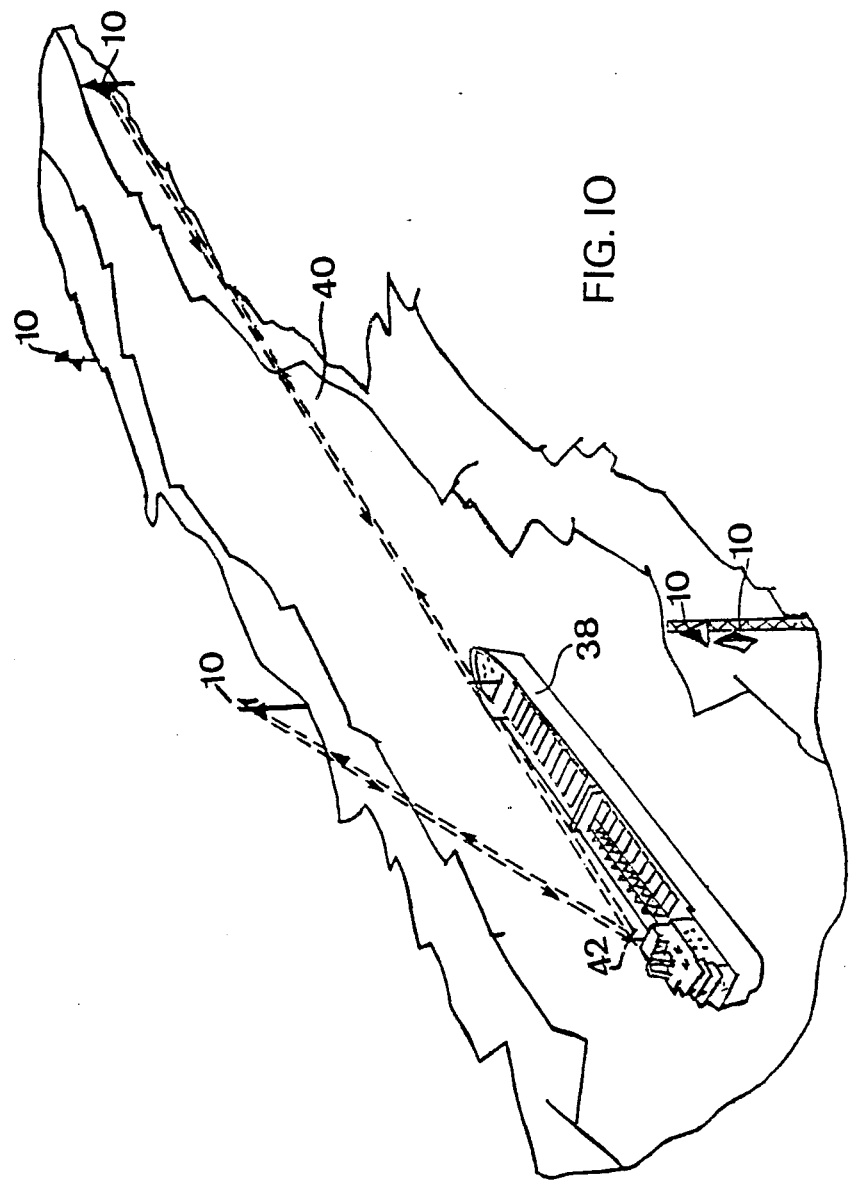
FIG. 10 illustrates a typical application of the reflectors of the invention in a maritime navigation system.

FIG. 10 illustrates a typical application of the invention to a maritime navigation system in which a vessel 38 navigating a waterway 40 makes use of a system comprising an interrogating radar transmitter/receiver, the antenna 42 of which is mounted on an elevated portion of the vessel, and a member of passive reflector 10 spaced along the waterway to determine the course it should follow along the Waterway.

Advantages of the invention are that the reflector is passive and possesses a large radar cross-section over a wide range of angles both vertically and horizontally and, by rotating the reflected wave by 90°, permits a clear and accurate discrimination of the target from adjacent buildings and other clutter, so that it is of particular use in maritime navigation, and aerial navigation. In addition, the trihedral reflector is relatively inexpensive and is straightforward to fabricate, the dimensions and polarization being modified as required to suit a variety of conditions and different radar system frequencies.

We claim:

1. A passive, non-powered trihedral corner reflector comprising three mutually substantially orthogonal conducting surfaces, a passive, non-powered polarizing grid located parallel to and spaced above one of the conductive surfaces, said non-powered polarizing grid consisting of an array of parallel passive grid conductors, the conductors being oriented parallel to a corner junction of two of the surfaces of the trihedral corner reflector to give symmetrical electromagnetic images of the polarizing grid in the other two orthogonal conducting surfaces, the grid conductors being proportioned and spaced apart so as to reflect a polarization component of an incident signal parallel to said conductors and to permit passage of a polarization component of the incident signal substantially perpendicular to the conductors, the grid conductive surface such that the transmitted component when reflected from the conducting surface is about 180° out of phase with the reflected component and the resulting reflected signal has a polarization substantially 90° different with respect to that of the incident signal.

2. A trihedral corner reflector as claimed in claim 1 wherein the three conducting surfaces are triangular and are exactly orthogonal.

3. A trihedral corner reflector as claimed in claim 1 wherein the three conducting surfaces are square and are exactly orthogonal.

4. A trihedral corner reflector as claimed in claim 1, in combination with a support structure upon which the reflector is mounted, wherein the reflector is tilted forward by substantially 35° from a horizontal reference plane to which orientation of the reflector is referred, and is rotated clockwise in a corresponding vertical reference plane by substantially 15°.

5. A trihedral corner reflector as claimed in claim 1 wherein the grid conductors are wires electrically spaced substantially one quarter the wavelength of the incident signal above the conducting surface.

6. A trihedral corner reflector as claimed in claim 1, in combination with a support structure upon which the reflector is mounted wherein the reflector is mounted on the support means inverted with at least the said one of the conductive surfaces having the polarizing grid parallel thereto facing downward to provide weather shielding of the conductive surfaces by the sides of the reflector.

7. A trihedral corner reflector as claimed in claim 1 wherein the grid conductors are wires spaced apart less than one quarter the wavelength of the incident signal, said polarizing grid thereby acting as a perfect short circuit to the parallel component of the incident signal.

8. A trihedral corner reflector as claimed in claim 1 wherein the grid conductors are wires mounted on the surface of a dielectric material of low permittivity, which thereby also spaces the wires the required distance from the conductive surface.

9. A passive, non-powered trihedral corner reflector comprising three mutually orthogonal triangular conducting surfaces, a passive, non-powered polarization grid mounted in the reflector parallel to and spaced above one conductive surface of the reflector by dielectric spacing means, said passive non-powered polarization grid consisting of an array of parallel passive non-powered conductors, the conductors being oriented parallel to a corner junction of two sides of the corner reflector to give symmetrical electromagnetic images of the polarization grid in other two of said orthogonal conducting surfaces, the parallel conductors of the said grid being proportioned and spaced apart substantially less than one quarter of the wavelength of the incident signal so as to reflect a component of the incident signal polarized parallel to said parallel conductors and permit passage of a component of the incident signal polarized substantially perpendicular to the conductors, the conductors being electrically spaced above the respective conductive surface such that the transmitted component when reflected from the conducting surface is about 80° out of phase with the component reflected from the grid, and the resulting reflected signal has a polarization rotated by 90° with respect to the polarization of the incident signal.

10. A trihedral corner reflector as claimed in claim 9, in combination with a support structure upon which the reflector is mounted, wherein the reflector is tilted forward by substantially 35° from a horizontal reference plane to which orientation of the reflector is referred, and is rotated clockwise in a corresponding vertical reference plane by substantially 15°.

11. A system of navigating a moving object having a transmitter/receiver of microwave electromagnetic radiation, and means for interrogating echoes of the transmitted radiation received from a series of spaced stationary passive, non-powered trihedral corner reflectors spaced apart generally parallel to the direction of movement of the object, each corner reflector comprising three substantially mutually orthogonal conducting surface, a passive, non-powered polarizing grid located parallel to and spaced above one of the conductive surface and consisting of an array of parallel passive non-powered conductors oriented parallel to a corner junction of the corner reflector to give symmetrical electromagnetic images of the grid in the other two orthogonal conducting surfaces, the grid conductors being proportion and spaced apart so as to reflect a polarized component of an incident signal parallel to said conductors and to permit passage of a polarized component of the incident signal substantially perpendicular to the conductors, the conductors being electrically spaced above the conducting surface such that the transmitted component reflected from the conducting surface is about 180° out of phase with the laterally reflected component and the resulting reflected signal has a polarization substantially 90° out of phase with the the incident polarization, each corner reflector being interrogated as said moving object moves past the corner reflector, the different polarization of the corner reflectors reflected signals being distinguished from reflections from unwanted targets to permit determination of the position of said moving object relative to said corner reflectors.

* * * * *